United States Patent [19]

Brown et al.

[11] Patent Number: 4,585,929
[45] Date of Patent: Apr. 29, 1986

[54] MAGNETIC STRIPE MEDIA READER MODULES AND CARIERS FOR MAGNETIC HEAD READER/ENCODERS FOR SUCH MEDIA

[75] Inventors: Edmund J. Brown, Topanga; Kenneth L. Miller, Torrance, both of Calif.

[73] Assignee: Xico, Inc., Santa Monica, Calif.

[21] Appl. No.: 504,808

[22] Filed: Jun. 16, 1983

[51] Int. Cl.⁴ .............................................. G06K 7/08
[52] U.S. Cl. .................................. 235/449; 235/482; 235/483; 360/2
[58] Field of Search ...................... 360/130.3, 104, 88, 360/2; 235/449, 482, 483

[56] References Cited

U.S. PATENT DOCUMENTS

| | | | |
|---|---|---|---|
| 3,890,644 | 6/1975 | Goetzinger et al. | 360/2 X |
| 4,149,669 | 4/1979 | Hermstein et al. | 235/449 X |
| 4,167,664 | 9/1979 | Pass | 235/449 |
| 4,297,735 | 10/1981 | Eppich | 360/130.3 X |

OTHER PUBLICATIONS

"Improved Reader for Magnetically Encoded ID Cards", *Computer Design,* Jan. 1981, pp. 148-149.
"Magnetic-Stripe-Credit-Card Card-Reader", Austin Lesea & Rodnay Zaks, *Microprocessor Interfacing Techniques,* SYBEX (2nd. Ed. 1977), pp. 120-126.
Data Sheets on "Hand Operated, Miniature Magnetic Card Reader-Model 801", (Rev. Jan. 1980).
Data Sheets on "MT-120 Card Reader", by Magtek.
"Specifications of Omron Manual Type Magnetic Card Reader", by Omron Tateisi Electronics Co.
Data Sheets on "Hand Operated Magnetic Stripe Reader", by Nippondenso.
Data Sheets on "Canon MCR-302".
Data Sheets on "Sanac Model MCM-12 Magnetic Card Reader", by Sankyo Seiki Mfg. Co., Ltd.
Data Sheets on "Magstripe Card Readers", by American Magnetics Corp.

*Primary Examiner*—David L. Trafton
*Attorney, Agent, or Firm*—Kendrick, Netter & Bennett

[57] ABSTRACT

Magnetic stripe media reader/encoders include reader/encoder body modules made of two complementary body elements that provide a track or path for guiding a magnetic stripe-carrying medium over a magnetic reader head, and magnetic head-carrying devices for magnetic stripe medium reader/encoder magnetic heads including a magnetic head-holding frame linked to a gimbaling frame-and-shaft combination linked, in turn, to a springy mounting mechanism.

23 Claims, 13 Drawing Figures

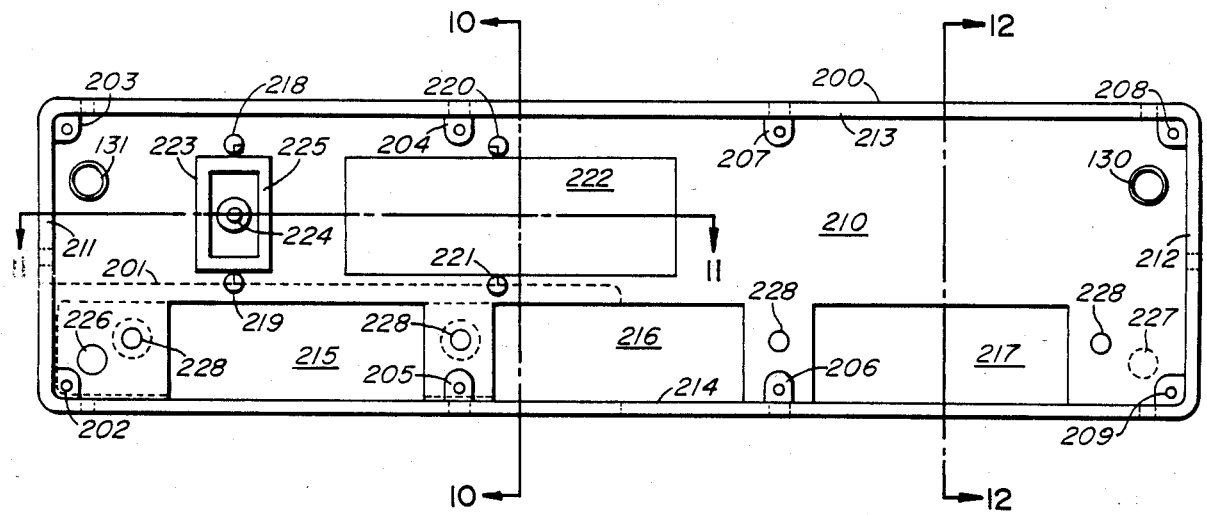
FIG. 9
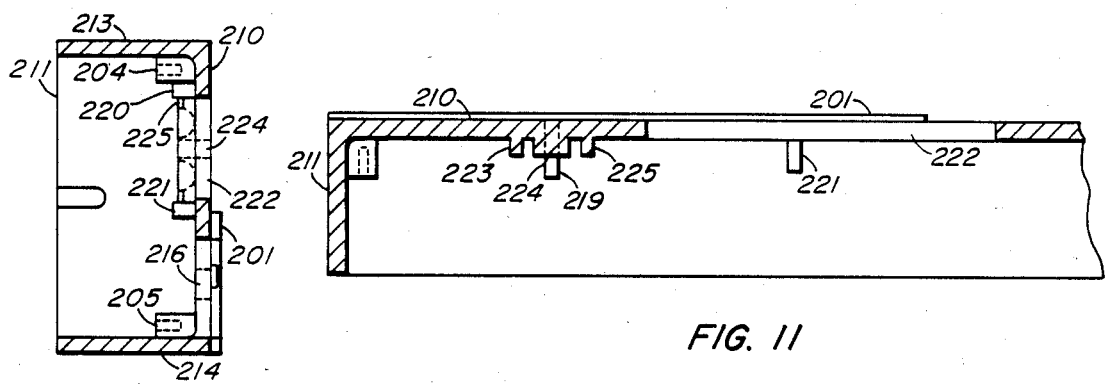
FIG. 10
FIG. 11
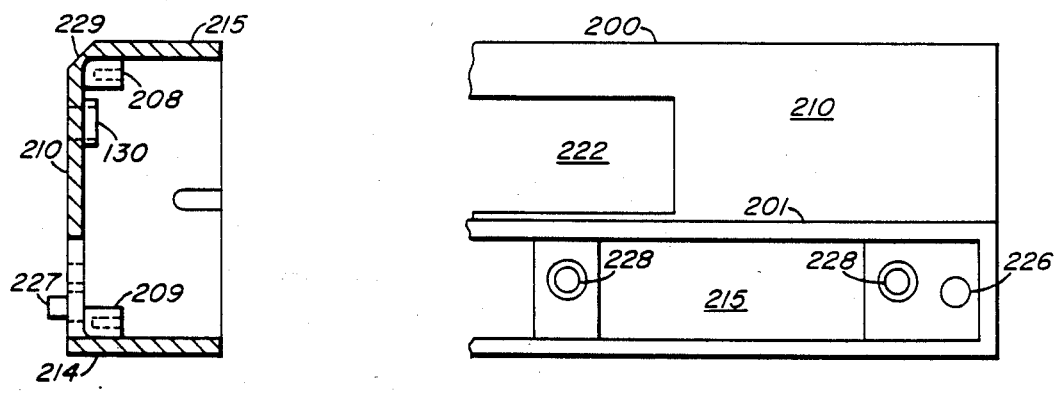
FIG. 12
FIG. 13

MAGNETIC STRIPE MEDIA READER MODULES AND CARIERS FOR MAGNETIC HEAD READER/ENCODERS FOR SUCH MEDIA

This invention relates to magnetic stripe reader/encoders that include new modular bodies and new, magnetic head carrier means for reading magnetically-encoded data on magnetic stripe-bearing media. Our new head carrier means hold, align and control the movement of magnetic heads for reading and writing magnetically-encoded data on a stripe of a magnetic stripe medium such as a card, badge or passbook. Our new modular bodies include means for mounting the new head carrier means in these bodies along a path or track that guides the stripe on a magnetic stripe-bearing medium over a magnetic head.

The new head carrier means includes: Movable means for holding a magnetic head, disposed for contact with a magnetic stripe; means for mounting the carrier means on a modular body; and a gimbaling means joined to the mounting means at one end, and affixed to the magnetic head-holding means at the other end.

In our new carrier means, the means for holding a magnetic head is preferably a four-sided frame having two relatively thick walls for aligning the magnetic head, and two thinner, more flexible walls that provide a spring action. The thinner walls facilitate press-fitting a magnetic head into the frame and, through the spring action, grip the magnetic head firmly in the frame during and after assembly. One of the relatively heavier walls may include anchoring means for joining the frame to the gimbaling means. Preferably, the anchoring means includes gripping means for a groove in a gimbaling pin that forms part of the gimbaling means. Engagement of the groove in the gripping means rigidly links the head-holding means to the pin of the gimbaling means.

The movable head-holding means includes, on at least two of its walls, retaining means, preferably integrally formed with the walls. Preferably, these retaining means are tapered projections into the area circumscribed by the head-holding frame. Tapering facilitates insertion of a magnetic head into the head-holding frame.

Our head-carrying means includes gimbaling means between the head-holding means and the mounting means. This gimbaling means permits limited rotation of the magnetic head on an axis transverse to the path of a magnetic stripe passing over the head. The amount of transverse axial rotation permitted is sufficient to accommodate variations in thickness of magnetic-stripe media while holding the gap of the magnetic head steadily transverse to, and in line with a magnetic stripe passing over the head. The gimbaling means also allows rotation of the head-holding means on an axis parallel to the path of a magnetic stripe passing over the head. The parallel axis rotation maintains the gap of the magnetic head parallel to, and steadily in contact with the magnetic stripe.

The means for linking the mounting means to the gimbaling means of our new carrier may, but need not, include a flat spring joined at one end to the mounting means. The other end of the spring is joined to a frame for the gimbaling means. This flat spring forms a transverse, rotatable link between the mounting means and the gimbaling means. Alternatively, the spring means may simply be made from a springy material such as a springy plastic, and without a discrete, flat spring. In this embodiment, the mounting means, the spring means and gimbaling means may be integrally formed from the springy material.

The gimbaling means of our new carrier means includes a gimbaling frame through which a gimbaling pin passes. The gimbaling pin is held centrally in the gimbaling frame by two notches, one at each end of the gimbaling frame. A first notch, formed between two posts at the end of the gimbaling frame nearest the mounting means, rotatably engages (and partially closes over) a groove near one end of the gimbaling pin. A second notch, formed between two posts at the opposite end of the gimbaling frame from the first notch, rotatably engages the gimbaling pin at the end of the gimbaling frame nearest to the head-holding means. The other end of the gimbaling pin itself is embedded in anchoring means in an end wall of the head-holding means.

The gimbaling pin rotates freely in the first and second notches, but is fixed and does not rotate in the anchoring means. When the pin rotates, therefore, the head-holding means rotates with it. Such rotation causes proper gimbaling parallel to the magnetic stripe, and proper alignment of the head-holding means relative to the magnetic stripe passing over the head. To these ends, the gimbaling pin should be concentric along its entire length, and should be sufficiently smooth to rotate freely in the two notches.

The new carrier means can be, and preferably is made of rigid thermoplastic or thermosetting plastic. The preferred plastic is a blend of polycarbonate resin, fiberglass and polytetrafluoroethylene (PTFE). One such blend, available from LNT Corporation under the tradename DFL 4034, is rugged, self-lubricating, and has low surface friction.

The preferred method for making our new carrier means comprises injection-molding the movable head-holding means, gimbal means and mounting means, with gimbaling pin and flat spring, if any, in place, in a single operation. Alternatively, we can mold the mounting means, head-holding means and gimbaling means separately, and then join them to one another in a separate operation. However, one-step, injection-molding precludes the need for precision alignment and precision joining of separately molded means.

Where the gimbaling means includes a separate, flat spring, the spring preferably comprises a flat berylium/copper spring with a series of small holes at each end, and, optionally, a larger hole in the center. Some of the small holes at each end facilitate positioning the spring in a mold. Plastic flows through other small holes during molding, locking one end of the spring in the mounting means and the other end in the gimbaling frame. The larger hole in the center of the spring minimizes warping. Through appropriate sizing, this larger hole permits adjustment of spring constant without a change in die configuration, or the molding process itself.

During the molding operation, and particularly where molding is done by injection, plastic flows into the groove near each end of the gimbaling pin, and prevents axial slippage along the pin of either the head-holding means or the gimbaling frame. As molded, the gimbaling pin does not rotate freely in the notches in the gimbaling frame. However, spreading the sides of the notches slightly breaks the plastic contact linking the pin to the sides of the notches, leaving the pin free to rotate in the notches, but precluding axial slippage of the pin.

Our new modular bodies include two complementary elements. All variations of these complementary body elements can be made in a single universal mold by varying the mold inserts. Preferably, these elements are injection-molded. The new modular bodies include a path or guide for magnetic-stripe media to swipe through completely, or, alternatively, to swipe to a stop. In both the swipe-through, and the swipe-to-stop configurations, the module can be adapted for a magnetic stripe medium to enter from the left and swipe right, or vice-versa. In any of these configurations, the medium can enter the path or track from the top of the module or from the end of the module.

In each of our new modular bodies, one body element includes means for mounting our new carrier means. These mounting means include means for receiving and seating the mounting means of our new carrier means, and means for joining the mounting means to the seating means of the body element. This body element also includes means for seating and aligning the gimbaling means for our new carrier means, and for disposing the magnetic head-holding means along the path or guide in our new modular body.

Each body element includes half of the guide or path means for a magnetic-stripe medium; means for facilitating entry of the magnetic-stripe medium into the guide or path inside the module; and, optionally, means for blocking or stopping the medium movement at one or both ends of the medium guide or path. Optionally, each of the body elements in our new modular bodies can provide seating means for light-emitting diodes or other indicator means. Each body element also includes bosses for PC boards inside the body. These bosses hold the PC boards away from other surfaces of the body.

The means for seating and aligning the mounting means of the carrier means on the body element includes means for holding the mounting means in planar alignment, and means for receiving a bolt or other fastener for joining the mounting means to the carrier-seating means on the body element. The seating and aligning means in the modular body is canted so that the length of the magnetic head gap is held in full contact with the magnetic stripe on the magnetic stripe medium inside the module. The canting bends the spring means, causing the magnetic head to exert pressure on a magnetic stripe passing over the head.

Preferably, each body element includes a four-sided, oblong frame with an additional panel extending from one end of the four-sided frame to the other, and from one side wall of the four-sided frame to the other. Projecting outwardly from, and at right angles to, the panel is the floor of the medium guide or path. When two complementary body elements are joined to one another, these panels cooperate to form a double-walled interior web in the module that forms the medium guide.

Preferably, each body element is injection-molded in a one-step operation. Preferably, body elements are made from a thermoplastic or thermosetting resin blend, preferably reinforced with fiberglass and augmented with PTFE or another lubricating polymer. Again, the preferred molding material is LNT Corporation's DFL 4034, which includes 20% fiberglass, 15% PTFE, and the balance polycarbonate. Molded from such materials, our modules require no metal surfaces, and permit many passes by a magnetic-stripe medium before the track begins to deteriorate. Moreover, because there are no metal surfaces (except for the magnetic head itself) for a magnetic-stripe medium to pass over, our modules exert little wear and tear on such media, and permit many more passes than modules having metal surfaces before the medium itself begins to deteriorate.

Our new modules serve two functions. First, our new modules permit mounting our new head carrier means in a path for a magnetic stripe on a magnetic stripe medium. Secondly, our new modules provide a path or track for a magnetic stripe medium to pass through, with the magnetic stripe on the medium facing and engaging the magnetic head to permit the magnetically-encoded data on the stripe to be read in a single pass or swipe through or along the track.

Our new head carrier has many advantages that no prior art device has. For example, our head carrier provides precise, stable alignment of the magnetic head; permits full gimbaling as the usual movement of the magnetic head for consistent, reliable head-to-medium stripe contact; provides optimum head pressure to self-clean the head and to preserve the life of the magnetically-encoded data in the magnetic stripe; and permits the use of heavy-duty, standard or economy magnetic heads as the user's needs and desires dictate.

Our new head carrier means and our new modules are preferably injection-molded from internally-lubricated and reinforced thermoplastic or thermosetting resin blends. preferably in a single-step, injection-molding process, assuring precise fit, and precluding the need to align separately molded parts. The single-step molding operation assures module-to-module uniformity and head-carrier-to-head-carrier uniformity, but permits the flexibility of having module bodies of many different configurations, including end entry, top entry, swipe-to-stop or swipe-through, and swipe from left to right or right to left. The new module bodies and the new head carrier are compact and lightweight, yet rugged and resistant to damage. Our new module bodies and new carriers have a minimum number of parts. Because of their flexibility, they permit reading hand-laminated cards and badges, and tolerate wide variations in the force with which the user inserts and swipes a card or other past the magnetic head.

Our new module bodies have many advantages as well. They provide precise capture of magnetic stripe cards, have biplanar reference surfaces, and are internally lubricated, providing smooth operation and a uniform response to swipe. The module surfaces are self-cleaning, and will accept media of widely varying thicknesses. The preferred injection-molded plastics minimize the use of metal surfaces, have high dimensional stability and tensile strength, low friction, and resist attack by chemicals, water and temperature. The new modules can accommodate a magnetic stripe on a front or back surface, can accommodate top entry and end entry guides for the media, and can permit swipe-through, or swipe-to-stop in either direction.

Our new head-carrier means and our new modular body can better be understood by reference to the drawings in which:

FIG. 9 is a side elevation view of our new module element including means for mounting and aligning our new carrier means and means for mounting PC boards on the module element;

FIG. 10 is an end elevation view of the seating and aligning means for the mounting means taken on line 10—10 in FIG. 9;

FIG. 11 is a cross-sectional view of the seating means shown in FIG. 9, but taken on 11—11 of FIG. 9;

FIG. 12 is an end view of the module element shown in FIG. 9, taken on line 12—12 in FIG. 9, and showing integrally-molded means for mounting an LED inside the module element; and FIG. 13 is a side elevation view of the other side of the module element shown in FIG. 9 in partial cross section.

Figure 1:
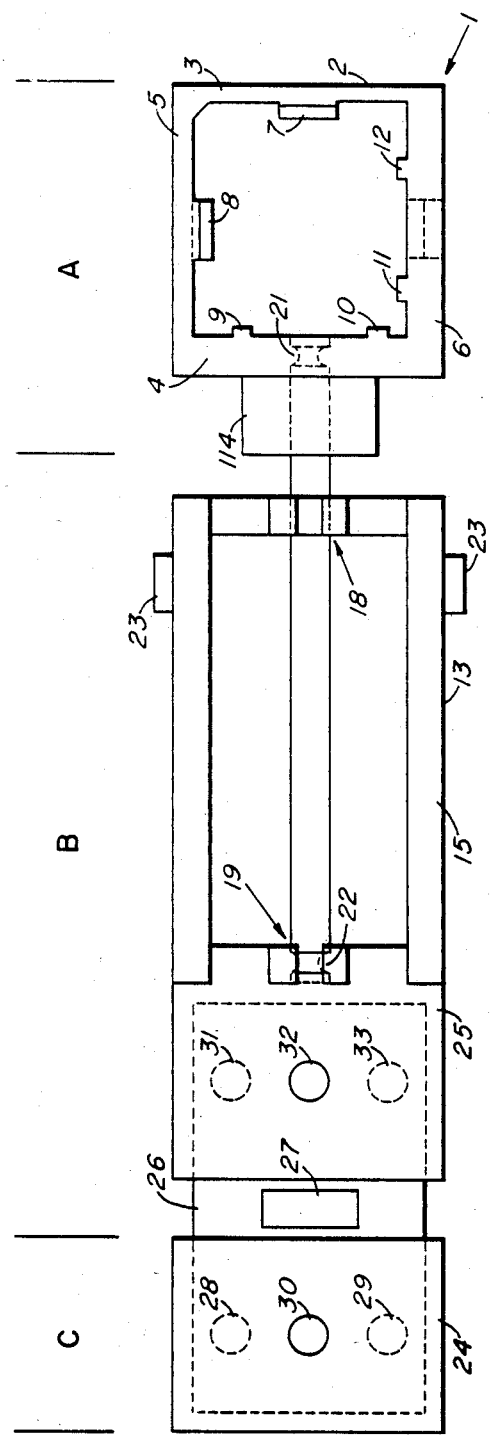
FIG. 1 is a plan view of one embodiment of our new head-carrier means.
Figure 2:
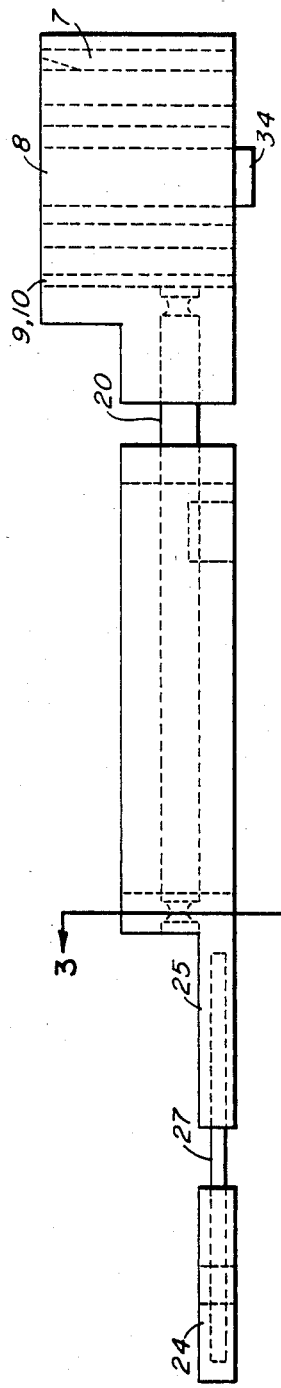
FIG. 2 is a side elevation view of the new carrier means shown in FIG. 1.

Referring now to FIG. 1, our new carrier means generally designated 1 includes head-holding means A; gimbaling means B; and mounting means C. Head-holding means A includes frame 2 comprising two relatively thick walls 6 and 4 and two relatively thinner walls 5 and 3. Projecting into the area circumscribed by walls 3, 4, 5 and 6, are integrally-molded, tapered, retaining means 7 and 8 and projections 9, 10, 11 and 12. These retaining means permit the magnetic head to be press-fit into frame 2, and then engage portions of the head to hold it in place. When the magnetic head is press-fit into frame 2, flexible walls 5 and 3 flex outwardly to permit the head to snap into frame 2. Tapered edge guards 34 on walls 5 and 6 lift the head if a card is forced in sideways, thus preventing damage to the head-holding means.

Gimbaling means B includes frame means 13 with edge guards 34 on walls 5 and 6. End members 16 and 25 include superimposed notches 18 and 19 through which passes gimbaling pin 20, which is free to rotate on the bearing surfaces inside notches 18 and 19. Gimbaling pin 20 passes through notch 18, and into wall 4 of the head-holding means A. Gimbaling pin 20 has a groove 21 embedded in and affixed to anchoring means 114 on wall 4 of head-holding means A. At its other end, gimbaling pin 20 has a second groove 22 which is rotatably mounted in notch 19. Gimbaling means B also includes flat spring means 26 which is sandwiched between mounting tab means 24 and notch-carrying means 25, and includes larger hole 27, appropriately sized to deliver the desired spring constant through the gimbaling means B to head-holding means A. Spring means 26 includes two smaller holes 28 and 29 through which molded plastic projects, linking the two sides of mounting means 24 to one another, and smaller hole 30, through which a bolt or other fastener can pass to join mounting means 24 to one of our new module means. Smaller holes 31 and 33 serve the same functions as smaller holes 28 and 29. Hole 32 serves to position spring 26 in the mold. Bosses 23 engage aligning posts 220 and 221 of the body module shown in FIG. 9. Mounting means C includes mounting element 24.

Figure 3:
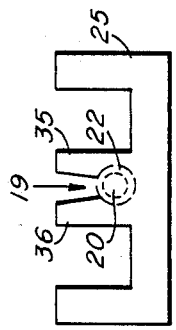
FIG. 3 is a cross-sectional view of the new carrier means shown in FIGS. 1 and 2, taken on line 3—3 of FIG. 2.

FIG. 3 shows in detail notch 19 formed by notch posts 35 and 36. Groove 22 near the end of gimbaling pin means 20 is seated in, and free to rotate in notch 19.

With a magnetic head in place in holding means A, and with mounting tab means C joined to one of our new module bodies, the linear movement, azimuthal movement, rotational movement and the lateral movement of the magnetic head are all limited. However, each such movement can take place in degree sufficient to permit a magnetic head carried in head-holding means A to maintain close contact with the magnetically-encoded data on the magnetic stripe borne by a magnetic stripe medium within wide limits of medium thickness and within widely varying limits of force with which the magnetic stripe medium passes over the magnetic head.

Figure 4:
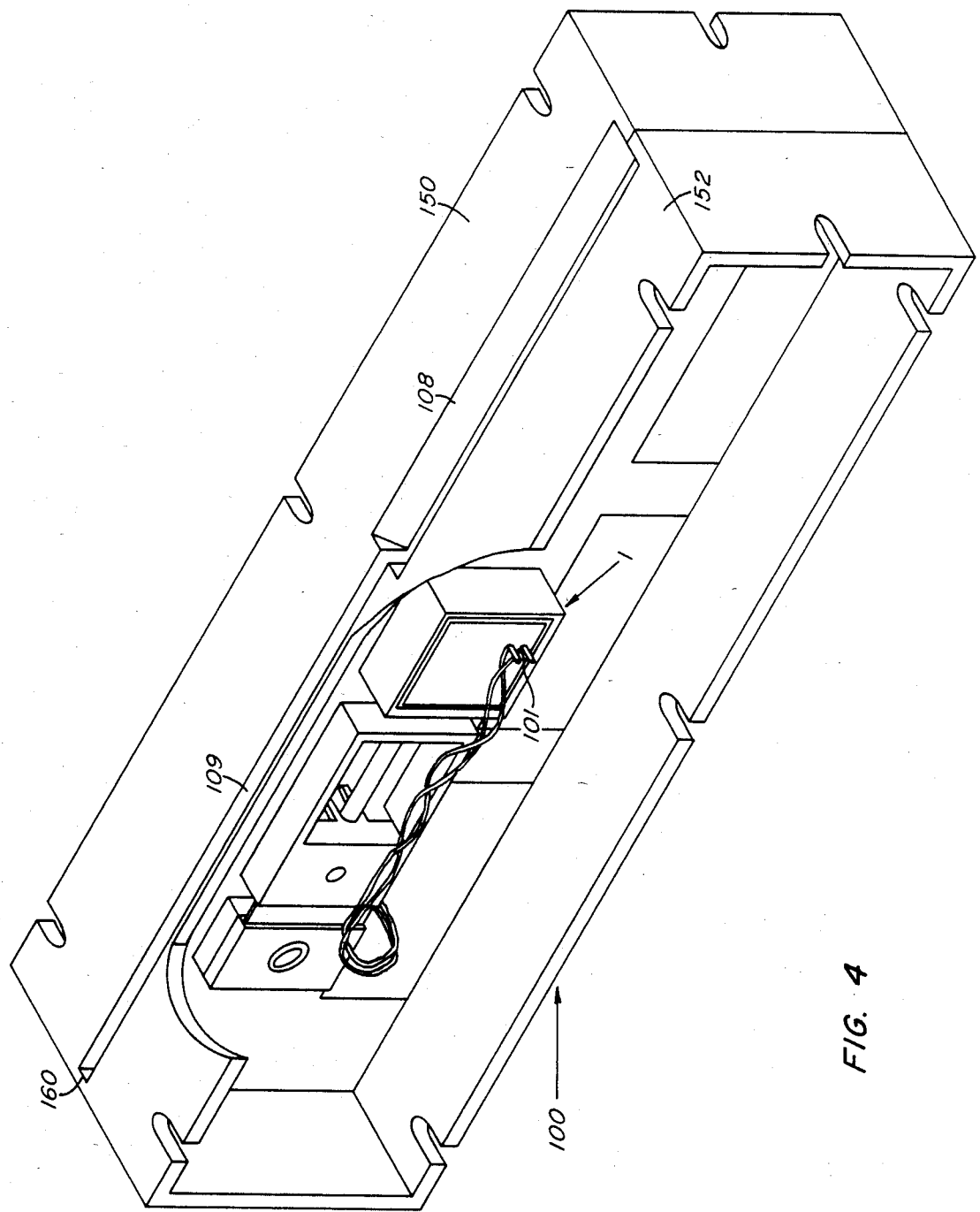
FIG. 4 is a perspective view of our new body module in a top entry, swipe-to-stop configuration.

FIG. 4 shows a perspective view of one version of our new modular card reader generally designated 100. Our new modular means includes two modular elements designated 150 and 152. In the configuration shown in FIG. 4, called a top-loading configuration, a magnetic-stripe card is inserted into the module through the V-shaped opening designated 108, and pushed down until the edge of the card comes into contact with the track or path inside the module (not shown in FIG. 4). The card is then swiped or passed from the V-shaped opening 108 through the card path 109 to the stop formed by end wall 160. Movement of the magnetic-stripe card along path 109 causes the magnetic stripe on the card to pass over the magnetic head 101 mounted in head-carrier means 1 projecting into path 109 from the side, which, in turn, permits the magnetically-encoded data on the stripe to be read.

Figure 5:
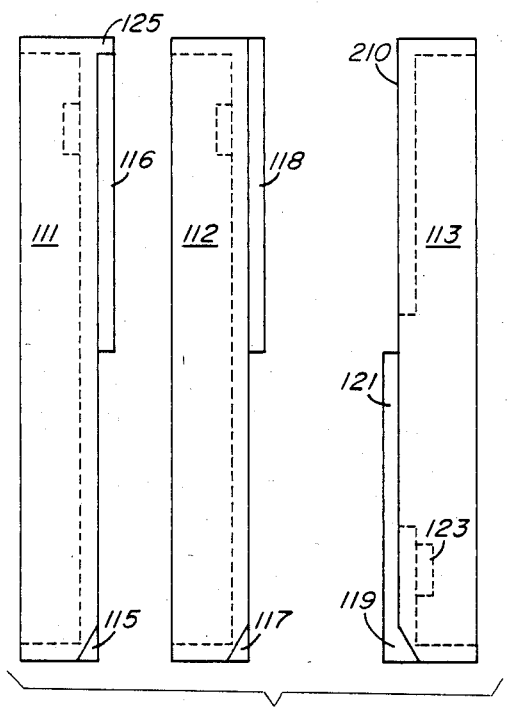
FIG. 5 shows our new complementary modular elements for end-loading, swipe-through or swipe-to-stop configurations with a magnetic head projecting into the magnetic stripe card path from the right.

FIG. 5 shows a top view of modular elements 111, 112 and 113. Modular element 111 includes a notched portion 115, which facilitates the entry of a magnetic stripe card (or other medium) from this notched end. Modular element 111 also includes magnetic stripe card guide or path 116. Similarly, module element 112 includes notches 117 and partial magnetic stripe card guide 118.

Modular element 113, which is complementary to both modular element 111 and modular element 112, includes notched openings 119 and partial magnetic stripe card guide element 121. Modular element 113 includes integrally-molded seating and aligning means 123 for the mounting means on our new carrier means. Where our new carrier means is joined to aligning and seating means 123, the magnetic head-carrying means projects from the right into the magnetic stripe card guide or path through opening 222 in face panel 210.

The only difference between modular elements 111 and 112 is that modular element 111 has an integrally molded stop element 125 at the end of its guide path so that the magnetic stripe card enters from the end where the notches 115 and 119 are, and swipes to the stop means 125. By contrast, a card entering the guide path from notches 117 and 119 of elements 112 and 113 swipes all the way through the modular body including modular body 112.

Modular element 111, when joined face-to-face to modular element 113, forms one configuration of our new modular body. This configuration provides card entry from the end, with the card swiping to a stop, and with the magnetic head projecting into the magnetic stripe card path from the right side of the path. Where modular element 112 is joined with modular element 113, the magnetic stripe card swipes completely through the guide path, but again the card entry is from the end of the module.

Figure 6:
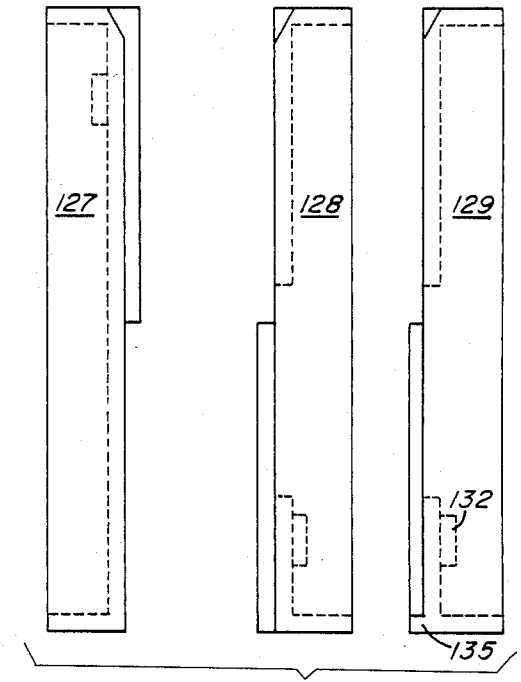
FIG. 6 shows our new complementary modular elements for end-loading, swipe-to-stop and swipe-through configurations with the head-holding means of the carrier means projecting into the magnetic stripe card path from the left.

FIG. 6 shows modular elements 127, 128 and 129. However, with the modular elements in FIG. 6, the magnetic head projects into the card path from the left because the aligning and seating means 131 and 132 are on the left side of the card path in this series of configurations. In this series of configurations, modular element 127 is joined to either of modular elements 128 or 129. Where joined to modular element 128, the card enters from the end, and passes completely through the modular means. Where element 127 joins with element 129, the magnetic stripe card also enters from the end, but swipes to stop means 135.

Figure 7:
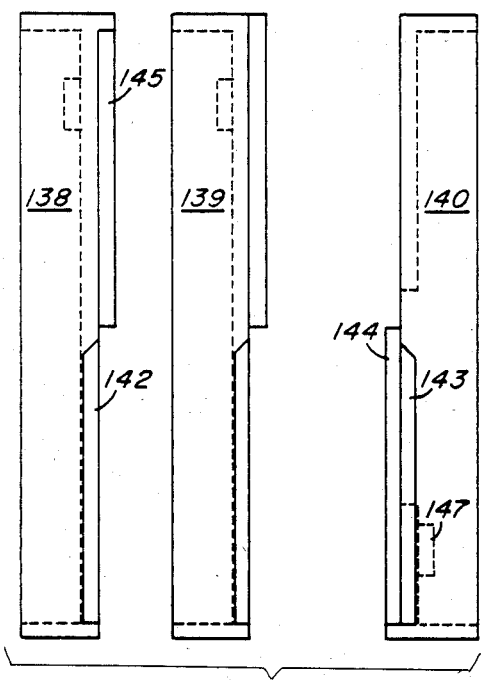
FIG. 7 shows our new complementary modular elements for a top-loading, swipe-to-stop or swipe through configurations with the magnetic head-holding means projecting into the path or guide from the right.

Turning now to FIG. 7, which includes modular elements 138, 139 and 140, these modular elements join to provide magnetic stripe card entry from the top to the guide path in the modular body, and swipe from the entry point to a stop or swipe completely through the module. Where modular means 138, with notched portion 142 for card entry, joins to modular element 140, with a complementary notched card entry portion 143, the magnetic-stripe card enters from the top through the notch formed by the joining of notched elements 142 and 143, and passes along a guide path formed by guide path elements 144 and 145. Card stop element 146 on module 138 stops the movement of the magnetic stripe card. Modular element 139 is the same as modular element 138 in all respects, except that element 139 does not include stop means 146. Accordingly, where element 139 joins with modular element 140, the magnetic-stripe card swipes completely through the resulting modular means. In each configuration of the modular element shown in FIG. 7, the aligning and seating means 147 in modular element 140 is placed such that the magnetic head projects into the magnetic card path from the right.

Figure 8:
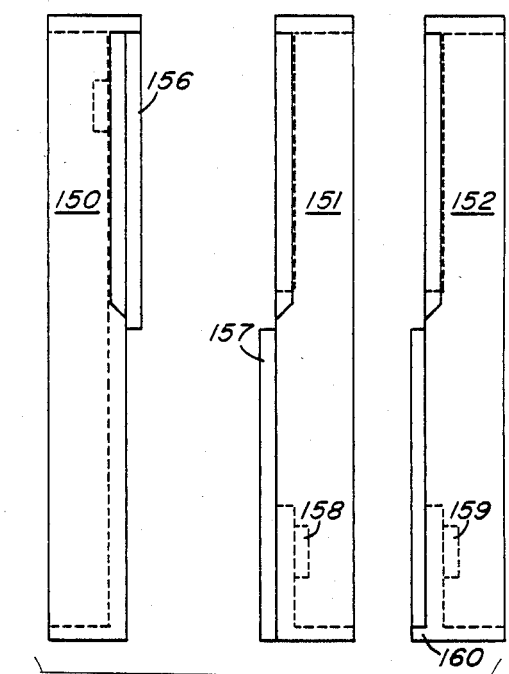
FIG. 8 shows our new complementary modular elements for the top-loading configuration in both swipe-to-stop and swipe-through configurations with the magnetic head-carrying means projecting into the card path from the left.

FIG. 8 shows modular elements 150, 151 and 152. These modular elements are similar to those shown in FIG. 7, but here the magnetic head projects into the card path from the left side of the path. In this series of configurations, element 150 is joined to either element 151 or 152. Element 151 combines with element 150 to form a swipe-through path. A card path guide formed by joining elements 150 and 151 is formed by partial guide path elements 156 on element 150 and guide path element 157 on modular element 151. The seating and aligning means 158 in element 151 assures that the magnetic head will project into the magnetic-stripe card path from the left. Aligning and seating means 159 in element 152 performs the same function. Joining element 152 to element 150 produces a swipe-to-stop configuration because element 152 includes stop wall 160.

FIGS. 9 and 13 are side elevation views of one of our new modular elements, here generally designated 200. FIG. 9 shows the inside of modular element 200; FIG. 13, the face of modular element 200 including outwardly-projecting guide path element 201. Integrally molded within modular element 200 is panel 210, which extends from end wall 211 to wall 212 of modular element 200, and from side wall 213 to side wall 214. Panel 210 includes antiwarping openings 215, 216 and 217, which permit panel 210 to remain substantially flat. Integrally molded along the interior of walls 211, 212, 213 and 214 are bosses 202, 203, 204, 205, 206, 207, 208 and 209. These bosses include openings for screws for mounting PC boards or electronic boards inside modular element 200, but spaced from panel 210. Holes 228 permit attaching two module halves together with screws. Hole 226 is to receive aligning post 227 on the obverse side of the complementary module half.

FIG. 12 provides another view of PC mounting bosses 208 and 209, and shows clearly that these mounting bosses can hold PC boards mounted thereon away from the surface of panel 210. FIG. 12 also shows mounting boss 130, identical to mounting boss 131, for LED's, phototransistors or other means for detecting the presence of a card or other magnetic stripe-bearing medium in the modular body. FIG. 12 also shows half of entry bevel 229 and aligning boss 227.

Also integrally molded as part of panel 210 are seating and aligning bosses 218, 219, 220 and 221 (see FIG. 9). Seating and aligning bosses 218 and 219 receive and seat the mounting means of our new carrier means; seating and aligning bosses 220 and 221 receive and align the gimbaling frame of our new magnetic head carrier means. The head-holding means of our new carrier means projects through opening 222 in panel 210 into the magnetic-stripe card path formed inside our new modular body.

As FIGS. 9, 10 and 11 show, seating and aligning means 223 for the mounting means of our new carrier means includes fastener hole 224 within integrally-molded seating frame 225 on which the mounting means sits. As FIG. 11 shows, seating frame 225 is slightly higher on its end nearest end wall 211 than on the opposite end near opening 222, thus canting the mounting means, gimbaling means and head-holding means of our new carrier means at a slight angle downwardly toward opening 222. As a result, the magnetic head-holding means of our new carrier means projects into the magnetic-stripe card path, and exerts firm, steady force on magnetic stripes passing over the head.

What is claimed:

1. Means for carrying a magnetic head comprising movable means for holding a magnetic head, disposed for contact with the magnetic stripe on a magnetic stripe-bearing medium; means for mounting said carrying means on a modular body; and gimbaling means linked to said mounting means at one end, and to said holding means at the other end, said gimbaling means including a frame with a shaft held centrally, and mounted rotatably in said frame, said shaft being rotatably mounted in notch means, one at each end of said gimbaling frame, with groove means near one end of said shaft rotatably mounted in the notch means nearest the mounting means, said shaft having substantially no axial freedom of movement, said shaft being anchored at one end in said head-holding means, and wherein, during formation of said gimbaling frame, one side of said gimbaling frame, except for notch means on said one side, closes around said shaft at a location on said shaft near said holding means, and a second opposing side of said gimbaling frame, except for notch means on said second side, closes around said shaft and flows into said groove forming bearing means for rotation of said shaft in said gimbaling frame.

2. The carrying means of claim 1 wherein said holding means includes means for aligning said magnetic head and means for gripping said magnetic head.

3. The carrying means of claim 2 wherein said holding means comprises a four-sided frame with two sides that align said magnetic head and two sides that grip said magnetic head.

4. The carrying means of claim 1 wherein said gimbaling means includes means for permitting sufficient rotation of said magnetic head on an axis transverse to the path of said magnetic stripe passing over said magnetic head to accommodate variations in thickness of said magnetic stripe-bearing medium and for holding the gap of said magnetic head steadily transverse to and in line with said magnetic stripe passing over said head.

5. The carrying means of claim 1 wherein said gimbaling means includes means for permitting rotation of said head-holding means on an axis parallel to the path of said magnetic stripe passing over said magnetic head, and for maintaining the gap of said magnetic head parallel to and steadily in contact with said magnetic stripe.

6. The carrying means of claim 1 wherein said gimbaling means includes means for permitting sufficient rotation of said magnetic head on an axis transverse to the path of said magnetic stripe passing over said magnetic head to accommodate variations in thickness of said magnetic stripe-bearing medium, and for holding the gap of said magnetic head steadily transverse to and in line with said magnetic stripe passing over said head, and means for permitting rotation of said head-holding means on an axis parallel to the path of said magnetic stripe passing over said magnetic head, and for maintaining the gap of said magnetic head parallel to and steadily in contact with said magnetic stripe.

7. The carrying means of claim 1 wherein said mounting means includes means for permitting rotation of said magnetic head on an axis transverse to the path of said magnetic stripe passing over said magnetic head.

8. The carrying means of claim 7 wherein said mounting means includes means for transversely rotating said gimbaling means with respect to said mounting means.

9. A modular body for mounting a magnetic head in the path of a magnetic stripe-bearing medium comprising two complementary elements, each of said elements including means for facilitating entry of magnetic stripe-bearing medium into said body, and comprising a four-sided frame and another panel extending from one side of said frame to the other, and from one side wall of said frame to the other, said panels forming a double-walled interior web in said modular body when said two complementary elements are joined to one another; means inside said body for guiding said magnetic stripe-bearing medium through said modular body along a path with said magnetic stripe disposed for contact with said magnetic head, and means outside said path for mounting at least one magnetic head on said body with said magnetic head projecting inside said body and disposed for contact with the magnetic stripe on said magnetic stripe-bearing medium as said medium passes along said path.

10. The modular body of claim 9 wherein said means for mounting said magnetic head outside said body includes means for receiving and seating magnetic head-carrying means on a surface of said body outside said path, said receiving and seating means comprising means for canting said magnetic head into the path of said magnetic stripe on said magnetic stripe-bearing medium passing along said path inside said body, and an opening for said magnetic head to project inside said modular body and into the path of a magnetic stripe passing along said path.

11. The modular body of claim 10 wherein each of said two complementary elements is injection molded from a single mold, said mold having inserts that permit formation of end entry or top entry of said magnetic stripe-bearing medium, left to right or right to left swipe of said medium, and swipe to stop or swipe through of said medium.

12. The modular body of claim 9 wherein each of said two complementary elements is injection molded from a single mold, said mold having inserts that permit formation of end entry or top entry of said magnetic stripe-bearing medium, left to right or right to left swipe of said medium, and swipe to stop or swipe through of said medium.

13. The carrying means of claim 1 wherein said holding means comprises a four-sided, head-holding frame, and wherein said shaft has a groove embedded in said frame to anchor said shaft to said frame.

14. The carrying means of claim 1 wherein said mounting means comprises a flat, springy mounting member parallel to the plane of said gimbaling frame, said flat, springy mounting member providing sufficient force on said holding means to hold a magnetic head therein firmly against the magnetic stripe on a magnetic stripe-bearing medium.

15. The carrying means of claim 3 wherein said holding means includes means to facilitate the forceable insertion of a magnetic head into said four-sided frame including projections on the interior surface of each of said two sides that align and each of said two sides that grip said magnetic head.

16. The carrying means of claim 1 wherein, after said gimbaling frame has been formed, each of said notch means is spread to break the link between the members forming said notch means to form bearings for the free rotation of said shaft in said notch means.

17. The carrying means of claim 14 wherein said mounting means further includes a reinforcing leaf spring embedded in said springy member during formation of said carrying means.

18. The carrying means of claim 17 wherein the spring constant of said springy tab is reduced by preventing the material forming said carrying means from completely covering said springy tab.

19. The modular body of claim 10 further comprising means alongside of said receiving and seating means for aligning magnetic head-carrying means adapted to be attached to said receiving and seating means.

20. The modular body of claim 9 wherein each panel on each of said two complementary elements includes a projection that forms the base of said path.

21. The modular body of claim 10 wherein each panel on each of said two complementary elements includes a projection that forms the base of said path.

22. A modular body for mounting a magnetic head in the path of a magnetic stripe-bearing medium comprising two complementary elements, each of said elements including means for facilitating entry of a magnetic stripe-bearing medium into said body, and comprising a four-sided frame and another panel extending from one side of said frame to the other, and from one side wall of said frame to the other, said panels forming a double-walled interior web in said modular body when said two complementary elements are joined to one another; means inside said body for guiding said magnetic stripe-bearing medium through said modular body along a path with said magnetic stripe disposed for contact with said magnetic head; and means outside said path for mounting at least one magnetic head on said body with said magnetic head projecting inside said body and disposed for contact with the magnetic stripe on said magnetic stripe-bearing medium as said medium passes along said path; said mounting means outside said path comprising a frame with a shaft held centrally, and mounted rotatably in said frame, said shaft being rotatably mounted in notch means, one at each end of said gimbaling frame, with groove means near one end of said shaft rotatably mounted in the notch means nearest the mounting means, said shaft having substantially no axial freedom of movement, said shaft being anchored at one end in said head-holding means, and wherein, during formation of said gimbaling frame, one side of said gimbaling frame, except for notch means on said one side, closes around said shaft at a location on said shaft near said holding means, and a second opposing side of said gimbaling frame, except for notch means on said second side, closes around said shaft and flows into said groove forming bearing means for rotation of said shaft in said gimbaling frame.

23. The modular body of claim 22 wherein said means for mounting said magnetic head outside said body includes means for receiving and seating magnetic head-carrying means on a surface of said body outside said path, said receiving and seating means comprising means for canting said magnetic head into the path of said magnetic stripe on said magnetic stripe-bearing medium passing along said path inside said body, and an opening for said magnetic head to project inside said modular body and into the path of a magnetic stripe passing along said path.

* * * * *